United States Patent
Tian et al.

(10) Patent No.: US 10,425,986 B2
(45) Date of Patent: Sep. 24, 2019

(54) METHOD AND APPARATUS FOR REPLAYING A MISSING VOICE STREAM PORTION AT A LATE ENTRY SUBSCRIBER DEVICE

(71) Applicant: MOTOROLA SOLUTIONS, INC., Chicago, IL (US)

(72) Inventors: Yong Tian, Chengdu (CN); Li-Ya Mi, Chengdu (CN); Zhong Wei, Chengdu (CN); Kang-Kai Zhao, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 101 days.

(21) Appl. No.: 15/553,242

(22) PCT Filed: May 8, 2015

(86) PCT No.: PCT/CN2015/078593
§ 371 (c)(1),
(2) Date: Aug. 24, 2017

(87) PCT Pub. No.: WO2016/179756
PCT Pub. Date: Nov. 17, 2016

(65) Prior Publication Data
US 2018/0063872 A1    Mar. 1, 2018

(51) Int. Cl.
*H04M 3/42* (2006.01)
*H04W 76/40* (2018.01)
(Continued)

(52) U.S. Cl.
CPC ....... *H04W 76/40* (2018.02); *H04M 3/42221* (2013.01); *H04M 3/56* (2013.01);
(Continued)

(58) Field of Classification Search
CPC ... H04W 76/40; H04W 4/16; H04M 3/42221; H04M 3/56
See application file for complete search history.

(56) References Cited

U.S. PATENT DOCUMENTS

| 8,139,721 B2 | 3/2012 | O'Connell et al. |
| 8,140,047 B2 | 3/2012 | Flatscher et al. |

(Continued)

FOREIGN PATENT DOCUMENTS

| EP | 2611236 A1 | 7/2013 | |
| WO | WO-2016029476 A1 * | 3/2016 | ............... H04W 4/10 |

OTHER PUBLICATIONS

Adamson, B. et al.: Nack-Oriented Reliable Multicast (NORM) Transport Protocol, Network Working Group, Request for Comments: 5740, Obsoletes: 3940, Category: Standards Track, Nov. 2009, all pages.
(Continued)

*Primary Examiner* — Rasha S Al Aubaidi
*Assistant Examiner* — Jirapon Intavong (57) ABSTRACT

Missed voice stream portions are replayed at a late entry subscriber device (SD) in a wireless radio network. The SD joins a voice call on a radio channel via a base station and detects that it is late to the call. The SD continues to receive a remaining portion of the call and plays back the portion of the call. The SD detects an end of the voice call, and (i) transmits a request message including an indication of a first duration of the portion of the call received or (ii) detects a similar message from another SD. The SD then receives an indication of a total duration of the voice call and calculates a third duration as a function of the total duration and the first duration. The SD receives and plays back the missed portion of the call for the third duration.

15 Claims, 7 Drawing Sheets

(51) Int. Cl.
*H04M 3/56* (2006.01)
*H04W 4/16* (2009.01)
*H04W 8/18* (2009.01)

(52) U.S. Cl.
CPC ...... *H04W 4/16* (2013.01); *H04M 2203/2088* (2013.01); *H04M 2203/305* (2013.01); *H04W 8/18* (2013.01)

(56) References Cited

U.S. PATENT DOCUMENTS

| | | | |
|---|---|---|---|
| 8,150,375 | B2 | 4/2012 | Munje |
| 8,331,545 | B2 | 12/2012 | Lingafelt et al. |
| 8,908,542 | B2 | 12/2014 | Patel |
| 2003/0153339 | A1* | 8/2003 | Crockett ................ H04M 3/56 455/518 |
| 2004/0081292 | A1* | 4/2004 | Brown .............. H04M 3/42221 379/68 |
| 2006/0293888 | A1 | 12/2006 | Jindal |
| 2007/0021131 | A1* | 1/2007 | Laumen ............ H04M 3/42221 455/518 |
| 2007/0280195 | A1* | 12/2007 | Shaffer .................. H04L 12/66 370/351 |
| 2008/0140550 | A1 | 6/2008 | Berezuk et al. |

OTHER PUBLICATIONS

Paul, Sanjoy et al.: "Reliable Multicast Transport Protocol (RMTP)", IEEE Journal on Selected Areas in Communications, vol. 15, Issue: 3, Apr. 1997, all pages.

The International Search Report and the Written Opinion, corresponding patent application No. PCT/CN2015/078593 filed May 8, 2015, all pages.

* cited by examiner

METHOD AND APPARATUS FOR REPLAYING A MISSING VOICE STREAM PORTION AT A LATE ENTRY SUBSCRIBER DEVICE

This application is a National Stage filing under 35 USC § 371 of co-pending Patent Cooperation Treaty international application having Serial No. PCT/CN2015/078593 (the 'PCT international application') filed on May 8, 2015. This, application claims priority to the PCT international application, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure which generally includes a network of various fixed terminals that are in direct radio communication with the subscriber devices. Each of the fixed terminals operating in the RAN may have one or more transceivers that may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another and may be non-overlapping or partially or fully overlapping with one another.

RANs may operate according to an industry standard land mobile radio (LMR) or cellular protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, the Digital Mobile Radio (DMR) standard also defined by the ETSI or the Long Term Evolution (LTE) protocol including multimedia broadcast multicast services (MBMS), among many other possibilities.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive voice streams (encoded portions of voice, audio, and/or audio/video streams) in a call in accordance with the designated protocol.

LMR systems may operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Individual (e.g., one to one) or group (e.g., one to many) calls may be made between wireless and/or wireline participants in accordance with the narrowband protocol or standard. Group members for group calls may be statically or dynamically defined. That is, in a first example, a user or administrator working on behalf of the user may indicate to the switching and/or radio network (perhaps at a controller device, such as a call controller, PTT server, serving gateway, radio network controller (RNC), zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

One problem that has arisen for group calls is that a target SD of the group call may enter an ongoing group call late, missing one or more portions of a voice stream in a voice call previously transmitted over a radio link due to any number of factors, including but not limited to: the target SD coming back into range after being out of range, the removal of a prior interferer within the range of the target SD or the base station serving the target SD, the avoidance of a prior geographic feature such as a building, hill, or tunnel that temporarily blocked communications between the target SD and its serving base station, the target SD powering up at or after a time the call started, or other user action at the target SD such as the swapping out of batteries. Conventionally, the user of the late entry target SD may listen to the remainder of the voice call and, during call hang time, key up and ask the source SD user to repeat what was missed. In other situations, the user of the late entry target SD may attempt to make sense and/or interpret the content or intent of the voice call using only the received portions of the voice stream.

Situations may arise, however, where the missed portions of the voice stream of the voice call are critical communications that may lead to undesired consequences if not accurately and fully rendered at all receiving SDs. For example, a situation may arise where a dispatcher or incident scene commander transmits a voice instruction instructing first responders "not to enter the building and seek survivors," perhaps due to known structural issues with the building's roof. If, due to one of the situations noted above, a target SD of the communication receives everything in the voice stream after the word "not," the entire context of the voice call changes and undesired consequences may result.

Accordingly, what is needed is an improved method and apparatus for replaying a missed voice stream portion at one or more late entry SDs in a voice call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for replaying a missed voice stream portion at one or more late entry SDs in a voice call.

In one embodiment, a method for replaying a missing voice stream portion at a late entry subscriber device in a wireless radio network includes joining, by a subscriber device, a transmitted voice call on a radio channel via a base station of the wireless radio network and detecting, by the subscriber device, that it is late to the voice call and missed a portion of the voice call that was transmitted prior to the subscriber device joining the voice call, continuing, by the subscriber device, to receive a remaining portion of the voice call and playing back the remaining portion of the voice call; detecting an end of the voice call, and responsively: one of (i) transmitting a first late entry request message to the base station requesting re-transmission of the missed portion of the voice call, the first late entry request message including an indication of a first duration of the remaining portion of the voice call received at the subscriber device and (ii) detecting transmission of a second late entry request message from another subscriber device requesting re-transmission of a second missed portion of the voice call, the second late entry request message including an indication of a second duration of a remaining portion of the voice call received at the another subscriber device shorter than the first duration, receiving, by the subscriber device from the base station on the radio channel, an indication of a total duration of the voice call, calculating, by the subscriber device, a third duration as a function of the total duration and the first duration, and receiving, by the subscriber device via the radio channel, the missed portion of the voice call and playing back the missed portion of the voice call for the third duration.

In another embodiment, a subscriber device for replaying a missing voice stream portion at a late entry subscriber device in a wireless radio network includes: one or more transceivers, one of a speaker and display, a data store, and one or more processors configured to: join, via the one or more transceivers, a transmitted voice call on a radio channel via a base station of the wireless radio network and detect that it is late to the voice call and missed a portion of the voice call that was transmitted prior to joining the voice call, continue to receive, via the one or more transceivers, a remaining portion of the voice call and play back, via the one of the speaker and the display, the remaining portion of the voice call, detect an end of the voice call, and responsively: one of (i) transmit, via the one or more transceivers, a first late entry request message to the base station requesting re-transmission of the missed portion of the voice call, the first late entry request message including an indication of a first duration of the remaining portion of the voice call received and (ii) detect, via the one or more transceivers, transmission of a second late entry request message from another subscriber device requesting re-transmission of a second missed portion of the voice call, the second late entry request message including an indication of a second duration of a remaining portion of the voice call received at the another subscriber device shorter than the first duration, receive, via the one or more transceivers, an indication of a total duration of the voice call, calculate a third duration as a function of the total duration and the first duration, and receive, via the one or more transceivers and the radio channel, the missed portion of the voice call and play back the missed portion of the voice call for the third duration.

In a still further embodiment, a process for enabling a replaying of a missing voice stream portion at a late entry subscriber device in a wireless radio network includes: causing to be transmitted, by an infrastructure controller, a voice call to a plurality of wireless subscriber devices in the wireless radio network on a radio channel, storing, by the infrastructure controller, the voice call and determining a total duration of the voice call, detecting an end of the voice call and transmitting, to the plurality of target wireless subscriber devices, an indication of the end of the voice call, receiving, from one or more late entry target wireless subscriber devices out of the plurality of target wireless subscriber devices, one or more indications of received durations of the voice call at respective ones of the late entry target wireless subscriber devices, identifying a minimum received duration out of the one or more indications of received durations of the voice call, calculating a third duration as a function of the total duration and the minimum received duration, and causing to be re-transmitted, by the infrastructure controller, a missed portion of the voice call to the one or more late entry wireless subscribers in the wireless radio network on the radio channel for the third duration.

Each of the above-mentioned embodiments will be discussed in more detail below, starting with example network and device architectures of the system in which the embodiments may be practiced, followed by an illustration of processing steps and message transmissions and/or receptions for achieving replaying of a missed voice stream portion from a subscriber device and from an infrastructure controller device perspective. Further advantages and features consistent with this disclosure will be set forth in the following detailed description, with reference to the figures.

1. NETWORK ARCHITECTURE AND DEVICE STRUCTURE

Figure 1:
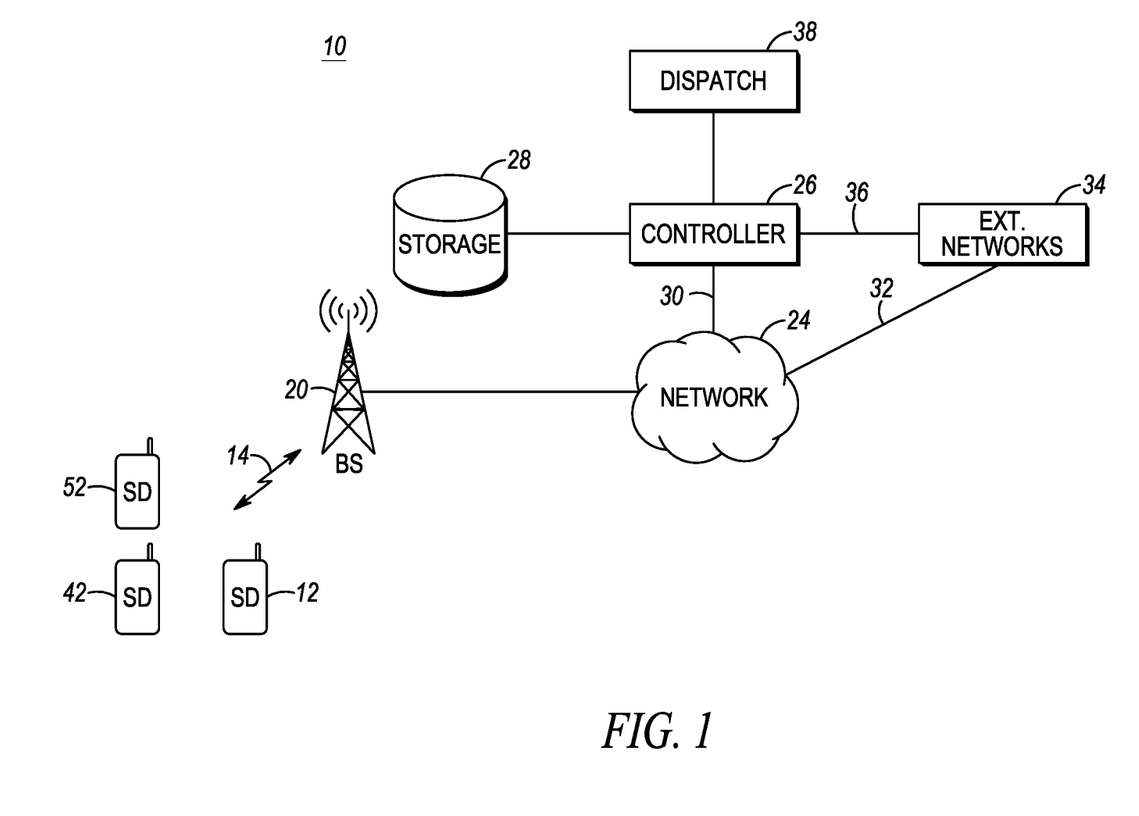
FIG. 1 is a block diagram of a communications network in accordance with some embodiments.

FIG. 1 illustrates a communications network 10 including client subscriber devices (e.g., SDs) 12, 42, 52, fixed terminal 20 (e.g. a repeater, base transceiver station (BTS) or eNodeB, hereinafter referred to as a base station (BS)), wireless link(s) 14, backhaul network 24, radio controller device 26, storage 28, communications connections 30, 32, 36, dispatch console 38, and external networks 34. The BS 20 has at least two radio transmitters covering a radio coverage cell (not shown). One or several SDs 12, 42, 52 within radio coverage of the BS may connect to the BS using a wireless communication protocol via wireless link(s) 14. The SDs 12, 42, 52 may communicate with each other, and perhaps other devices accessible via other network links, using a group communications protocol over the wireless link(s) 14. The wireless link(s) 14 may include one or both of an uplink channel and a downlink channel, and may include one or more physical channels or logical channels. Wireless link(s) 14 may implement, for example, a conventional or trunked land mobile radio (LMR) standard or protocol such as ETSI Digital Mobile Radio (DMR), Project 25 (P25) standard defined by the Association of Public Safety Communications Officials International (APCO), or other radio protocols or standards. In other embodiments, wireless link(s) 14 may implement a Long Term Evolution (LTE) protocol including multimedia broadcast multicast services (MBMS). Other types of wireless protocols could be implemented as well.

In the example of FIG. 1, wireless link(s) 14 are established between SDs 12, 42, and 52 and BS 20 for transmission of a SD or other device-sourced voice call including a voice stream (e.g., formatted bursts, packets, messages, frames, etc. containing digitized audio representing a portion of an entire call, among other possible signaling and/or other payload data) to one or more target devices, such as SDs 12, 42, and SD 52, perhaps belonging to a same subscribed group of SDs as the source SD or device. The terms "voice stream" and "voice stream portion" are not intended to be limited to voice-only communications, but rather, to embody all possible digitized audio/visual payloads, including but not limited to, voice, audio, and/or audio/video or voice/video multiplexed streams.

Wireless link(s) 14 may be half duplex or full duplex, and may include a unicast, multicast, or broadcast uplink channel for transmitting a voice call from a source SD or other wireless device (not shown) to the serving BS 20 and/or for transmitting requests from SDs 12, 42, or 52 for missing voice stream portions.

Wireless link(s) 14 may further include a multicast or broadcast downlink traffic channel for transmitting the voice call to SDs 12, 42, 52 that are partied to the voice call via the serving BS 20. While only a single BS 20 is illustrated in FIG. 1 serving a group of SDs 12, 42, and 52, additional BSs serving additional SDs, still under the control of the controller device 26, may be provided in additional or alternative embodiments. The uplink and downlink channels may be paired channels allocated to a single call or group of SDs, or unpaired channels separately allocated for the voice call or group of SDs. The uplink and downlink channels may be conventional channels permanently assigned to a group of SDs that include SDs 12, 42, and 52, or may be a trunked traffic channel or MBMS channel temporarily assigned to the group of SDs for the purpose of conducting the voice call. In addition, wireless link(s) 14 may include a separate control channel uplink and/or downlink for transmitting call request and call grant messages and for allocating trunked traffic channels for voice calls, among other functions. Other types of wireless links and communications system architectures are possible as well.

The SDs 12, 42, 52 may be configured with an identification reference (such as an International Mobile Subscriber Identity (IMSI) or MAC address) which may be connected to a physical media (such as a Subscriber Identity Module (SIM) card). Each SD 12, 42, 52 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in communications network 10 allows a single SD, such as a source SD (not shown), to communicate with one or more group members (such as SDs 12, 42, 52) associated with a particular group of SDs at the same time. In the example set forth in FIG. 1, SDs 12, 42, and 52 are members of a first group identified as G_A.

Although only one group of three SDs is illustrated in FIG. 1, the present disclosure is not limited as such, and more or fewer groups, SDs, and BSs could be used in any particular implementation. Furthermore, while a single controller device 26 is illustrated in FIG. 1, more than one controller device 26 may be used and/or a distributed controller device 26 may be used that divides functions across multiple devices, perhaps for load balancing reasons. Finally, while storage 28 is illustrated as directly coupled to controller device 26, storage 28 may also be disposed remote from controller device 26 and accessible to controller device 26 via one or more of network 24 and/or external networks 34.

The BS 20 may be linked to the controller device 26 via one or both of network 24 and communications connection 30. Network 24 may comprise one or more BSs, routers, switches, LANs, WLANs, WANs, access points, or other network infrastructure. For example, controller device 26 may be accessible to BS 20 via a dedicated wireline or via the Internet. In one example, BS 20 may be directly coupled to controller device 26 via one or more internal links under control of a single communications network provider. Network 24 may further include a call controller, PTT server, zone controller, evolved packet core (EPC), mobile management entity (MME), radio network controller (RNC), base station controller (BSC), mobile switching center (MSC), site controller, Push-to-Talk controller, or other network device for controlling and distributing voice streams amongst SDs via respective BSs.

Controller device 26 may be a separate device in the infrastructure of the communications network 10 configured to aid in replaying missed voice stream portions for late entry SDs. For example, and in one embodiment, the (infrastructure) controller device 26 may be configured to store (perhaps via storage 28) copies of voice streams for voice calls transmitted between SDs in the communications network 10, and to subsequently respond to a request to fulfill a missing voice stream portion from target SDs. As noted above, controller device 26 functions may be coupled with or included in other devices in the network 24, in which case controller device 26 may be a zone controller, PTT server, or the like.

Storage 28 may function to store decoded digitally encoded voice or formatted voice streams themselves from transmitted voice calls along with various mappings that identify a source of the voice data and, if not already included in the voice data when stored, a chronological identifier, such as time stamps or a duration value that identifies a duration of each voice call. The stored voice data and/or mapping(s) can then be used by the controller device 26, in one embodiment, to fulfill requests for a missing voice stream portion.

The one-to-many group communication structure may be implemented in communications network 10 in a number of ways and using any one or more messaging protocols, including multiple unicast transmissions (each addressed to a single group member SD), single multicast transmissions (addressed to a single group or multiple groups), single broadcast transmissions (the broadcast transmission perhaps including one or more group identifiers that can be decoded and matched by the receiving SDs), or any combination thereof.

External networks 34 may also be accessible to BS 20 (and thus SDs 12, 42, 52) via network 24 and communications connection 32 and/or controller device 26 and communications connections 30, 36. External networks 34 may include, for example, a public switched telephone network (PSTN), the Internet, or another wireless service provider's network, among other possibilities.

Dispatch console 38 may be directly coupled to controller device 26 as shown, or may be indirectly coupled to controller device 26 via one or more of network 24 and external networks 34, or some other network device in network 24. The dispatch console 38 may provide an administrative or dispatch access to SDs 12, 42, 52 and controller device 26, and allow an administrator or dispatcher to initiate infrastructure-sourced group communications to groups of SDs 12, 42, 52, including the storage and fulfillment of missing voice stream functions provided by controller device 26, among other features and functions.

Figure 2:
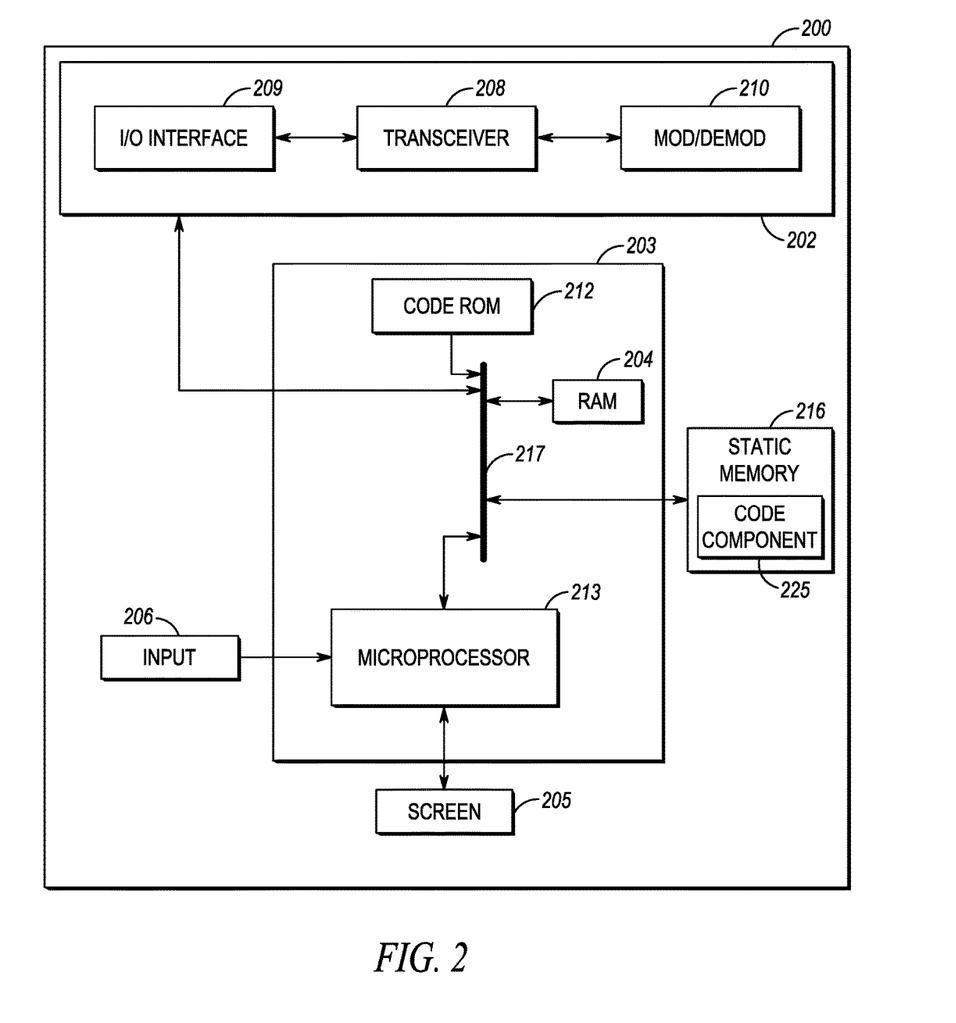
FIG. 2 is a block diagram of an infrastructure controller device in accordance with some embodiments.

Referring to FIG. 2, a schematic diagram illustrates a controller device 200 according to some embodiments of the present disclosure. Controller device 200 may be, for example, the same as or similar to the controller device 26 of FIG. 1. As shown in FIG. 2, controller device 200 includes a communications unit 202 coupled to a common data and address bus 217 of a processing unit 203. The controller device 200 may also include an input unit (e.g., keypad, pointing device, etc.) 206 and a display screen 205, each coupled to be in communication with the processing unit 203.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with networks 24, SDs 12, 42, 52, external networks 34, dispatch consoles 38, and/or storage 28. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210.

The microprocessor 213 has ports for coupling to the input unit 206 and to the display screen 205. Static memory 216 may store operating code for the microprocessor 213 that, when executed, performs one or more of the controller device processing, transmitting, and/or receiving steps set forth in FIGS. 5-7 and accompanying text. Static memory 216 may also store, permanently or temporarily, information disclosed herein as being stored at controller device 200 and/or storage 28, including but not limited to voice streams, associated duration information, and SD group membership information, among other information.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
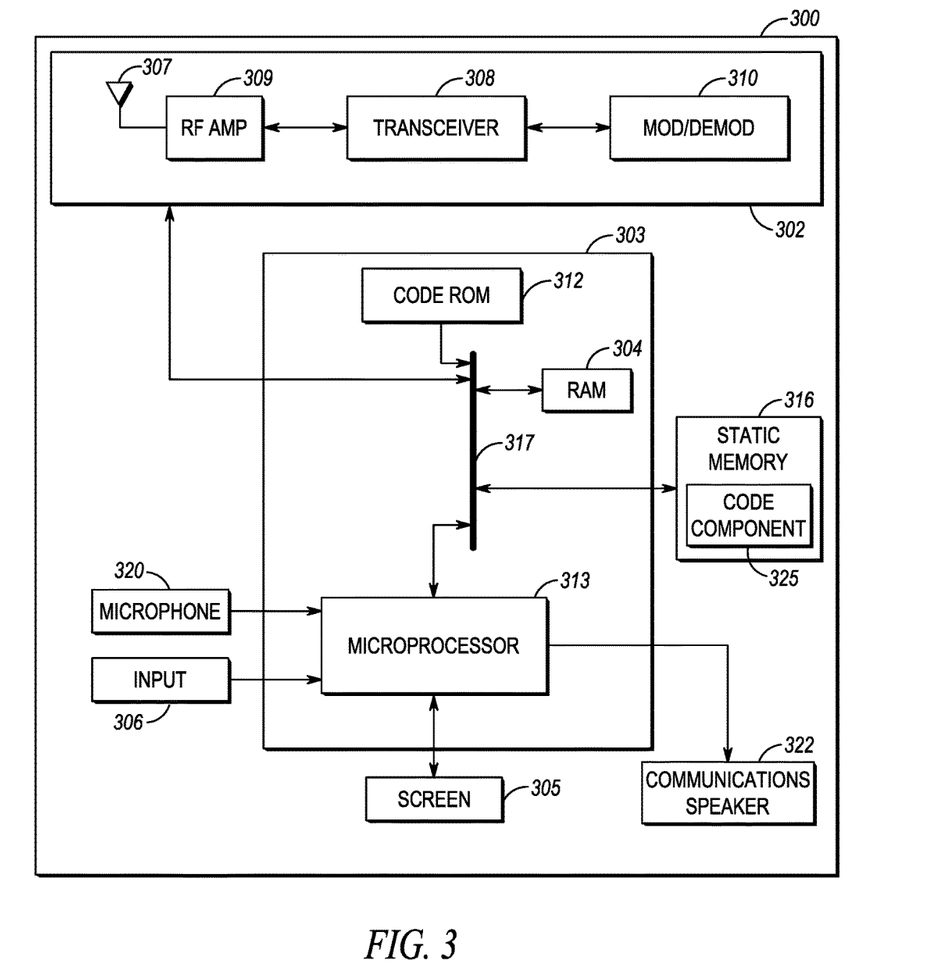
FIG. 3 is a block diagram of a subscriber device in accordance with some embodiments.

Referring to FIG. 3, a schematic diagram illustrates an SD 300 according to some embodiments of the present disclosure. SD 300 may be, for example, the same as or similar to the SD 12 of FIG. 1. Other SDs such as SDs 42, 52 may contain same or similar structures. As shown in FIG. 3, SD 300 comprises a radio frequency communications unit 302 coupled to a common data and address bus 317 of a processing unit 303. The SD 300 may also include an input 306 and a display screen 305, each coupled to be in communication with processing unit 303. A microphone 320 captures audio from a user that is further vocoded by processing unit 303 and transmitted as voice stream data by communication unit 302 to other SDs and/or other devices in the network 24. A communications speaker 322 reproduces audio that is decoded from voice streams of voice calls received from other SDs and/or from an infrastructure device via the communications unit 302. Display screen 305 may reproduce image or video data decoded from display media accompanying the voice stream received from other SDs via the communications unit 302.

The processing unit 303 may also include a code ROM 312 for storing data for initializing system components. The processing unit 303 may further include a microprocessor 313 coupled, by the common data and address bus 317, to a RAM 304 and a static memory 316.

The radio frequency communications unit 302 is a combined receiver (or receivers) and transmitter (or transmitters), e.g., transceiver(s) 308, having a common antenna 307. In some embodiments, additional separate or shared antennas may be provided for each one or more transmitter and/or receiver. The radio frequency communications unit 302 has the transceiver 308 coupled to the antenna 307 via a radio frequency amplifier 309. The transceiver(s) 308 may include a transceiver operating in accordance with one or more standard protocols, such as a DMR transceiver, a P25 transceiver, an LTE transceiver, a TETRA transceiver, and/or other type of wireless transceiver configurable to communicate via a wireless network. Other types of standards and protocols are possible as well. The transceiver 308 is also coupled to a combined modulator/demodulator 310.

The microprocessor 313 has ports for coupling to the input 306 and to the display screen 305. The microprocessor 313 further has ports for coupling to the microphone 320 and to the speaker 322, and/or other input and output devices. In some embodiments of the present disclosure, the static memory 316 may store operating code for the microprocessor 313 that, when executed by the microprocessor 313, perform one or more of the SD processing, transmitting, and/or receiving steps set forth in FIGS. 4-6 and accompanying text. Static memory 316 may comprise, for example, a HDD, an optical disk drives such as a CD drive or DVD drive, a SSD, a tape drive, a flash memory drive, or a tape drive, to name a few.

2. PROCESSES FOR REPLAYING A MISSING VOICE STREAM PORTION

Figure 4:
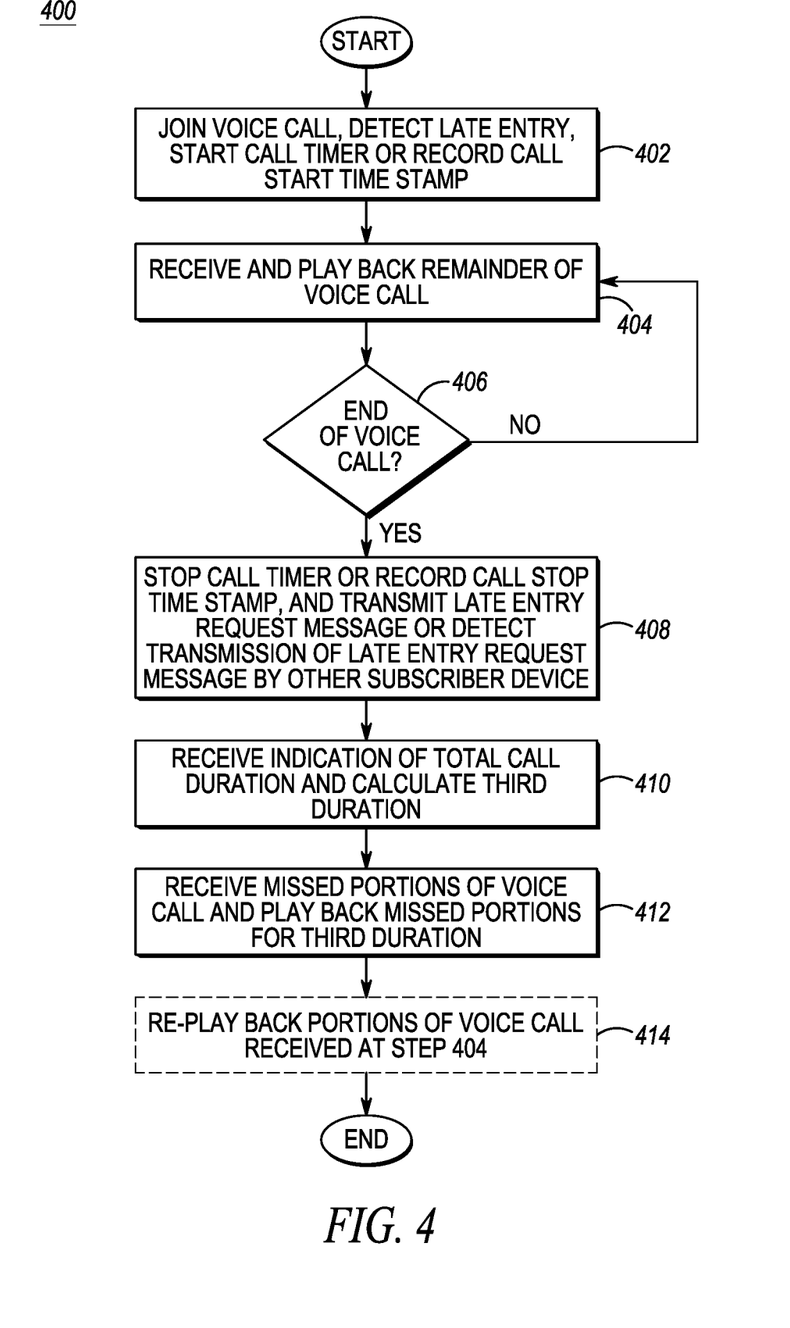
FIG. 4 is a flow diagram illustrating processes carried out by the subscriber device of FIGS. 1 and 3, in accordance with an embodiment.
Figure 5:
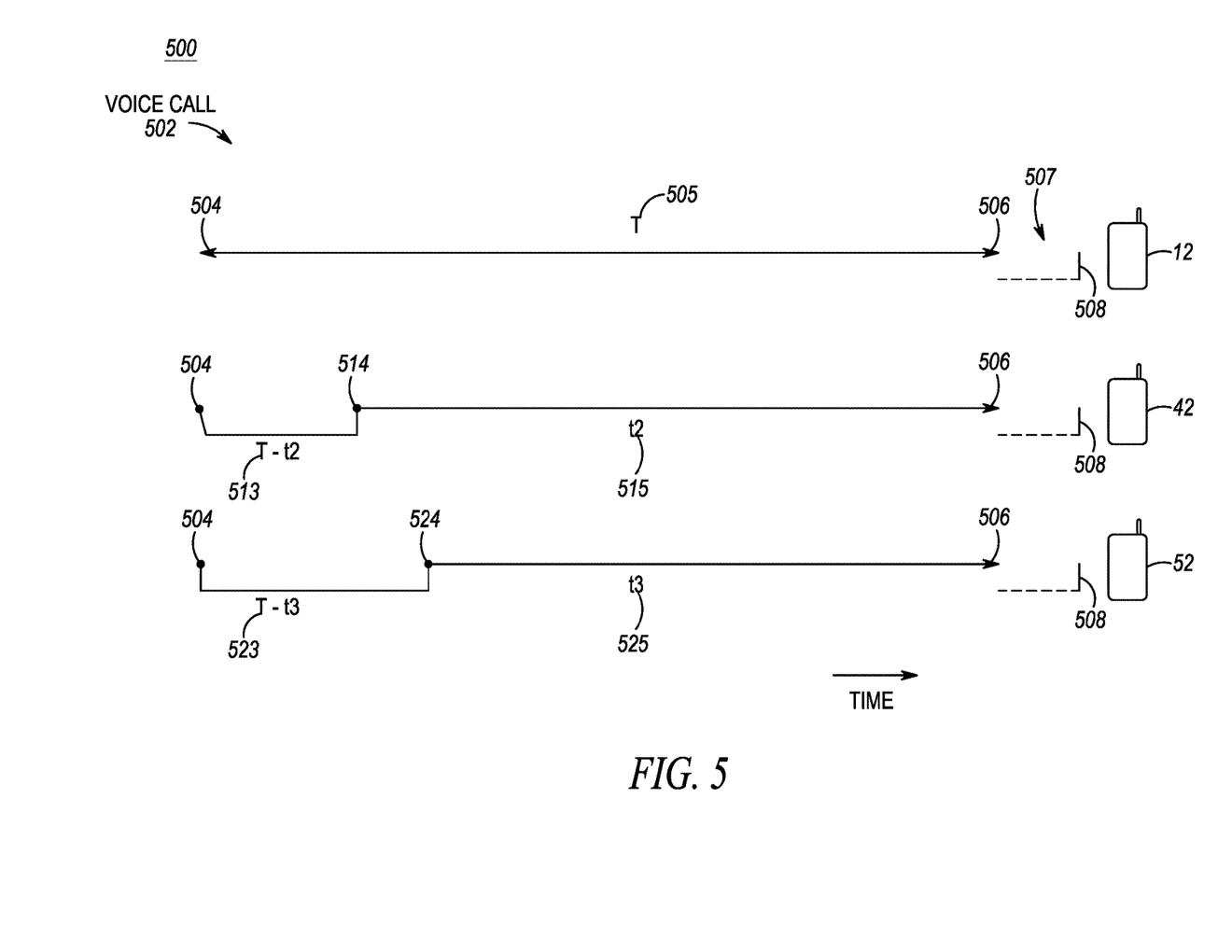
FIG. 5 is a timing diagram illustrating late entry of two subscriber devices to an ongoing voice call, in accordance with an embodiment.
Figure 6:
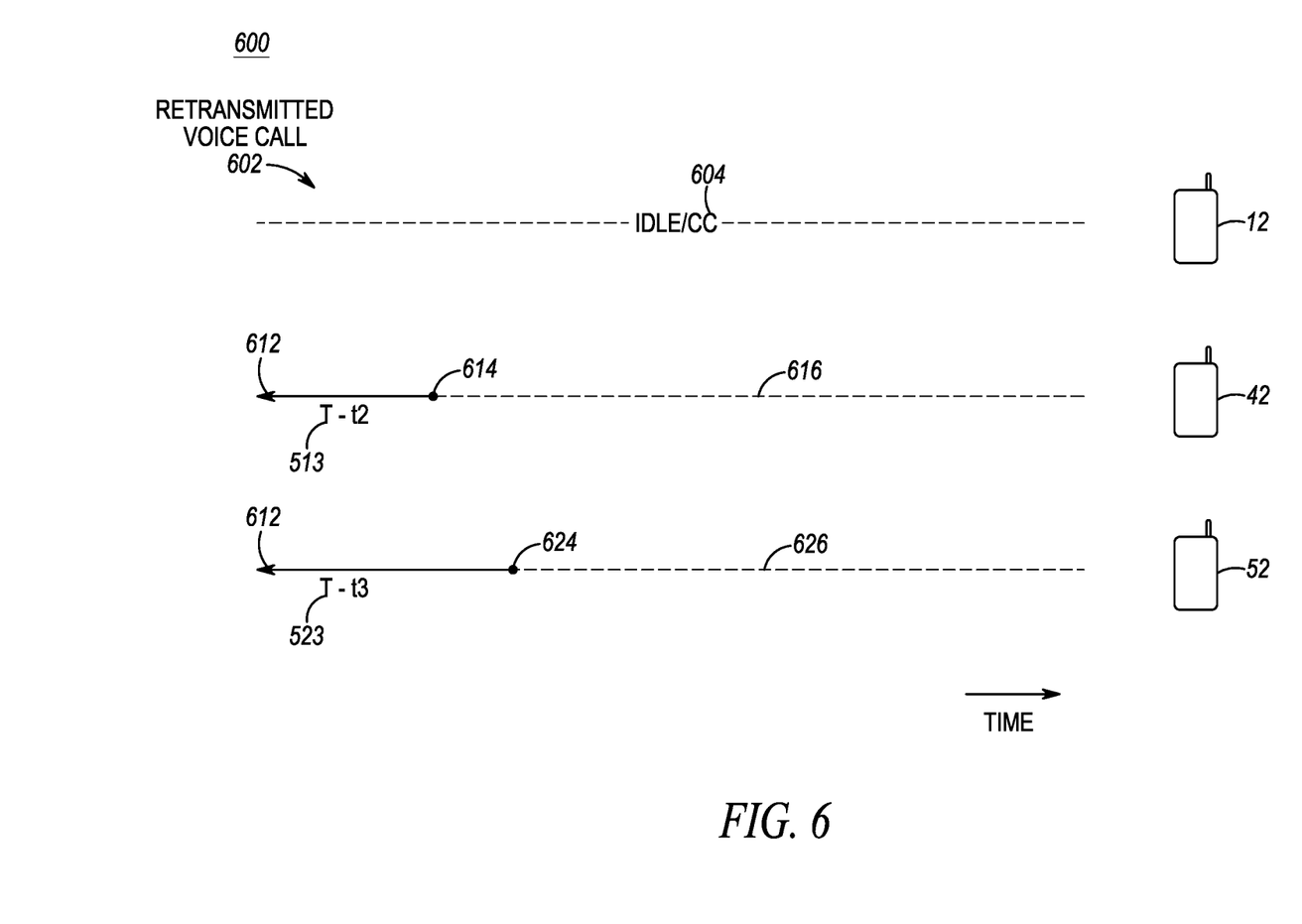
FIG. 6 is a timing diagram illustrating a re-playing of a missed voice stream portion of FIG. 5, in accordance with an embodiment.
Figure 7:
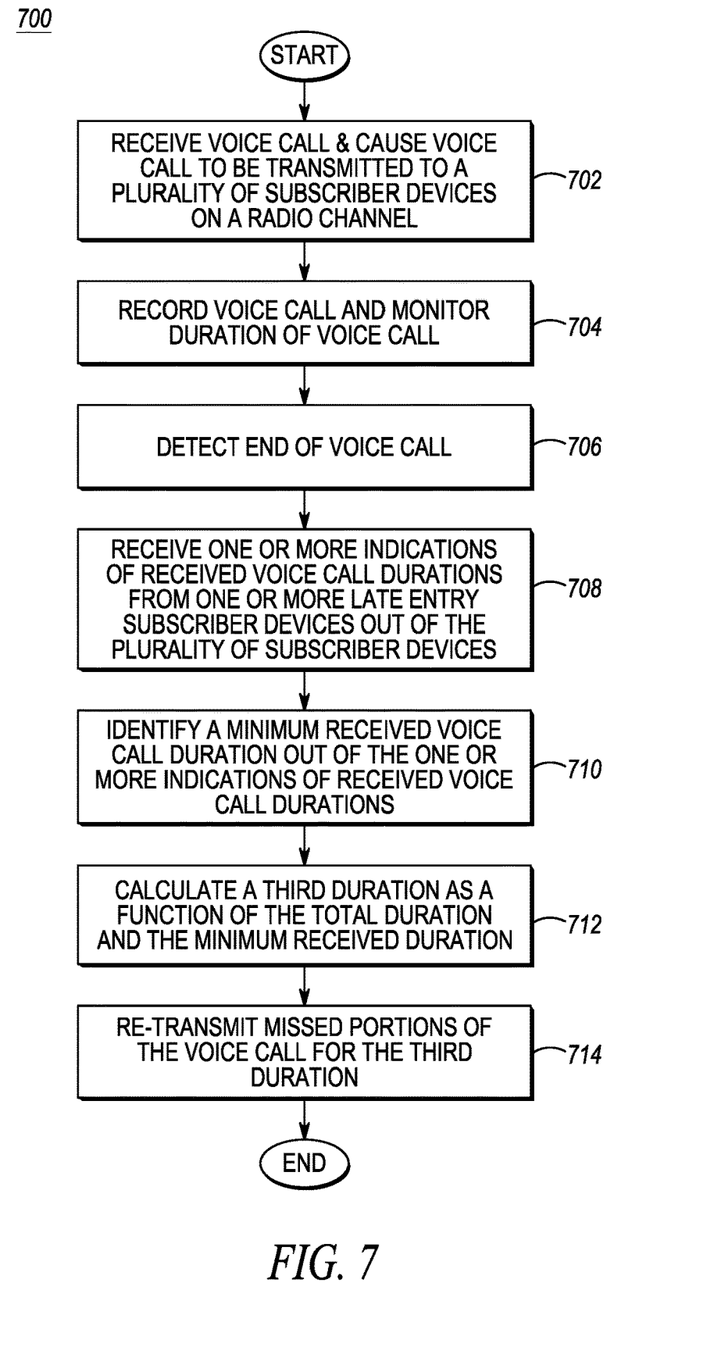
FIG. 7 is a flow diagram illustrating processes carried out by the infrastructure controller device of FIGS. 1 and 2, in accordance with an embodiment.

FIGS. 4 and 7 set forth respective flow diagrams illustrating example processes 400, 700 in a communications network, such as communications network 10 of FIG. 1, for replaying a missing voice stream portion from an SD and from an infrastructure controller device perspective, respectively. Of course, additional steps, receptions, and/or transmissions not disclosed herein could be additionally added before, after, or in-between steps, receptions, and/or transmissions disclosed in FIGS. 4 and 7, and the presence of such additional steps, receptions, and/or transmissions would not negate the purpose and advantages of the examples set forth in detail throughout the remainder of this disclosure. FIGS. 5 and 6 set forth timing diagrams for use in further illustrating particular steps of the processes 400, 700 with respect to an example replaying of a missing voice stream portion amongst the SDs 12, 42, and 52 of FIG. 1.

FIG. 4 illustrates an example in accordance with an embodiment for a replaying of a missing voice stream portion from the perspective of a late entry SD, such as SDs 42 or 52 of FIG. 1. In some embodiments, only certain types of calls, such as emergency calls (which are signaled as such in the call request and/or embedded within the call) may be provided the corresponding ability to replay missing voice stream portions, while non-emergency calls are not. Other types of selective applications are possible as well.

Starting then at step 402 of FIG. 4, a late entry SD joins late to an ongoing group voice call on a downlink radio channel, for example a downlink radio channel of wireless link(s) 14 of FIG. 1, and detects and/or otherwise determines that it has missed a voice stream portion of the newly joined ongoing voice call. The downlink radio channel may be a conventional radio channel on which the SD is configured to idle, may be a trunked radio channel temporarily assigned for the ongoing voice call, or may be an MBMS radio channel temporarily assigned for the voice call, among other possibilities. Furthermore, the downlink radio channel may be a first time slot channel of a multi-slot time division multiple access (TDMA) radio link, may be a first frequency channel of a multi-frequency frequency division multiple access (FDMA) system, or may be a subcarrier in an orthogonal frequency division multiplexing access (OFDMA) system. Other possibilities exist as well.

A source of the voice call may be another SD in the same wireless communication system as the late entry SD, another SD in a different wireless communication system as the late entry SD but communicatively linked to the wireless communication system of the late entry SD, an infrastructure device such as a dispatch console in the wireless communication system of the late entry SD, or some other source device. The source device captures its user's voice, surrounding audio, and/or surrounding audio/video (e.g., captures a media stream) or retrieves previously stored voice, audio, and/or audio/video (e.g., loads a stored media stream), encodes the audio if not already encoded, formats the encoded audio into a voice stream for transmission (e.g., into one or more headers, bursts, frames, messages, or packets), and then transmits the corresponding voice stream in one or more transmissions to a serving BS, such as BS 20, which then wirelessly forwards the transmissions to subscribing group SDs such as SDs 12, 42, 52 of FIG. 1.

The late entry SD may be late to the voice call for any number of reasons, including but not limited to the SD coming back into range after being out of range of a serving BS, the removal of a prior interferer within the range of the SD or the BS serving the target SD, the avoidance of a prior geographic feature such as a building, hill, or tunnel that temporarily blocked communications between the SD and its serving base station, the SD powering up at or after a time the call started, or other user action at the SD such as the swapping out of batteries.

The SD may detect that it is a late entry SD or otherwise missed a portion of the voice stream of the joined voice call in a number of ways. For example, the SD may have detected a call update message on a separate control channel in the wireless communication system, instead of an initial call grant message transmitted at the start of the voice call, indicating that it is late to the group call but including enough information so that the SD can still join the (ongoing) group call on the assigned traffic channel. In another embodiment, the SD may detect an embedded link control message with call information, including a target group identifier associated with a group that it is subscribed to, embedded in the transmitted voice call payload or payloads instead of in a call header including the call information preceding the start of the transmitted voice call. Other examples are possible as well.

Also at step 402, the SD may begin a call duration timer to time the length of the ongoing voice call that it actually receives and plays back. All late entry SDs may maintain their own separate call duration timer so they can determine the amount of missing voice stream to replay later in the process. In other embodiments, each late entry SD may record a call start time stamp associated with receipt of a first one of the remaining portions of the voice call.

An example timing diagram of this situation is illustrated in FIG. 5, in which a group call is being transmitted to group member SDs 12, 42, and 52. In this example, SD 12 joins the voice call 502 at the start 504 of the voice call, and thus does not detect a late entry to the voice call. On the other hand, SD 42, for any one of the reasons set forth above, joins the voice call late at time 514, detects a late entry to the voice call, and starts its call duration timer or records a call start time stamp. Similarly, SD 52 joins the voice call 502 even later at time 524, detects a late entry to the voice call, and starts its own call duration timer or records its own call start time stamp.

Returning to FIG. 4, at step 404, the SD continues to receive and play back audio extracted from the received voice stream portion of the ongoing voice call, for example, via a communications speaker such as speaker 322 of SD 300 or via a voice-to-text transcription process and displayed via a display such as display 305 of SD 300. More specifically, the SD receives formatted portions of the voice stream (e.g., one or more headers, bursts, frames, messages, or packets), extracts and decodes portions of the original encoded audio from the one or more formatted portions of the voice stream provided in the received transmissions, and begins rendering the portion of the decoded audio (e.g., via speaker or display). In some embodiments, the SD may also store the received voice stream, in its original received form or in its extracted and decoded form or in its text-converted form, for example in static memory 316 of SD 300, for later re-play of the entire voice call, including the missed portions and the received and played-back portions of the voice stream. With reference to FIG. 5, for example, late entry SDs 42 and 52 receive and playback the received voice stream portions of the voice call during the respective received call duration time periods t2 and t3. In this example, SD 42 thus missed a portion T–t2 513 of the voice call (although it may not know it yet) and SD 52 thus missed a portion T–t3 523 of the voice call (again, although it may not know it yet), and plays back audio received during respective time periods t2 and t3.

At step 406 of FIG. 4, the SD determines whether the ongoing voice call has ended. The SD may determine that the ongoing voice call has ended in a number of ways. For example, the SD may detect an end of the ongoing voice call by receiving a message from its serving B S indicating the release of a PTT button at the source device and/or the start of a call hang time. A call hang time is a period in a LMR system in which the radio channel is reserved for members of the ongoing group call to key up (e.g., by activating their own PTT button) and respond to communications previously transmitted in the ongoing voice call. After the hang time period expires, the radio channel is either opened up for any device to key up (e.g., SDs outside of those SDs subscribed to the group associated with the ongoing voice call) or is otherwise returned to a pool of available traffic channels that may be assigned to newly requested and granted voice calls, among other possibilities. In some embodiments, the SD may be configured to determine that the ongoing voice call has ended once the preconfigured call hang time has expired. In still further embodiments, the SD may be configured to determine that the ongoing voice call has ended when a threshold period of time has passed without any new detectable audio being received in the ongoing voice call. Other possibilities exist as well.

If an end to the voice call is not detected at step 406, processing reverts to step 404, where additional voice stream data of the ongoing call is received, decoded, rendered, and/or stored at the SD. If, however, an end to the voice call is detected at step 406, processing proceeds from step 406 to step 408. With reference to FIG. 5, a start of call hang time is indicated by reference numeral 506 and an end of the call hang time is indicated by reference numeral 508. Accordingly, late entry SDs 42 and 52 may detect an end of the voice call 502 at times 506 (at the start of hangtime 507) or 508 (after the hangtime 507 period expires), among other possibilities.

At step 408 of FIG. 4, the late entry SD stops the call duration timer started at step 402 or records a call end timestamp, and then either transmits a late entry request message itself, or begins monitoring a radio channel (e.g., the uplink radio channel, which may or may not be paired with the downlink radio channel over which the voice call was received) for late entry request messages transmitted by other SDs. The transmission of the late entry request message acts as an implicit negative acknowledgment (NACK), with the advantage that the message provides an indication of what portion of the voice call was missed, and the sending of which is triggered by a determination that the SD arrived late to the ongoing voice call.

In one embodiment of step 408, each late entry SD that was receiving the voice call may not monitor the uplink radio channel at all, but may separately transmit a late entry request message that indicates a call duration of the voice stream portion it actually received. The transmission of the late entry request messages may be accomplished via a random hold off period after detecting the end of the voice call, a carrier sense mechanism, a schedule transmitted by the controller device 26, or some other uplink communication mechanism. With reference to FIG. 5, in this example, each of SDs 42 and 52 separately transmit late entry request messages indicating a received call duration (t2 and t3 or call start and/or call end timestamps associated with t2 and t3, respectively) of the voice call 502 that it actually received.

In another embodiment of step 408, each late entry SD may apply a random hold off period, but monitor the uplink radio channel for transmission by other late entry SDs, and may only transmit their own late entry request message if they fail to detect any late entry request messages sent by other late entry SDs, or if they fail to detect a late entry request message indicating a call duration less than or equal to their own call duration (e.g., a particular late entry SD only transmits a late entry request message at the random hold off period if no other SD has transmitted an indication that they missed as much of or more of the voice call as the particular late entry SD did). With reference to FIG. 5, SDs 42 and 52 may apply random hold off periods, and in the event that SD 52 happens to transmit its late entry request message first with a timer value of t3 or a call start timestamp 524, and SD 42 detects that transmission, SD 42 may refrain from transmitting its own late entry request message with a received call duration value of t2 or call start timestamp 514 since SD 52 missed a larger portion of the voice call 502. In other embodiments, SDs 42 and 52 may apply random hold off periods, and in the event that SD 42 happens to transmit its late entry request message first, and SD 52 detects that transmission, SD 52 may still transmit its own late entry request message with a timer value of t3 or call start timestamp 524.

In a still further embodiment of step 408, the hold off period may be calculated as a function of the call duration timer value or the call start timestamp 514/524, so that late entry SDs with smaller call duration values or later call start timestamps (e.g., indicating they missed more of the voice call) transmit at a shorter hold off time period than late entry SDs with larger call duration timer values or earlier call start timestamps. In this manner, the first late entry SD to transmit should provide a sufficient missing voice stream portion to compensate for all remaining late entry SDs on the radio channel. With reference to FIG. 5, in this example, the SD with the smallest timer value would always transmit first (in this case, SD 52 transmitting its late entry request message with a timer value of t3 or timestamp 524), saving all other SDs with larger late entry call duration values or earlier timestamps from having to transmit a late entry request message.

At step 410 of FIG. 4, the late entry SD receives an indication over the downlink radio channel of the total call duration of the previously transmitted voice call, and calculates a third duration, equivalent to the missed duration of the previously transmitted voice stream of the voice call, as a function of its own received call duration timer value and the transmitted total call duration. With reference to FIG. 5, SD 42 receives the indication of a total call duration time T and calculates a third duration (T−t2) 513 equivalent to the missed duration of the previously transmitted voice call. Similarly, SD 52 receives the indication of a total call duration time T and calculates a third duration (T−t3) 523 equivalent to the missed duration of the previously transmitted voice call. In this case, SD52 missed more of the original voice call 502, and thus reported a smaller call duration timer t3 than that (t2) reported by SD 42, but calculates a larger third duration (T−t3) 523 than SD 42 (T−t2) 513.

At step 412 of FIG. 4, the late entry SD receives the missed voice stream portion of the previously transmitted voice call over the radio channel, and plays back the missed portions for the calculated third duration. With reference to FIG. 6, SD 12 did not join the call late, so it is illustrated in FIG. 6 as remaining IDLE 604 on the radio channel (and not receiving and/or playing back the missed voice stream portion via the voice call 602) or leaving the radio channel and returning to the control channel (CC) 604, among other possibilities. SD 42, on the other hand, begins receiving and playing back the missed voice stream portion via the voice call 602 beginning at time 612, lasting for the duration T−t2 513, and then stopping receiving and playing back the missed voice stream portion via the voice call 602 beginning at time 614. At time 614, SD 42 may similarly transition to an idle state (on a conventional channel) or return to a control channel (in a trunked system), among other possibilities. SD 52 similarly begins receiving and playing back the missed voice stream portion via the voice call 602 beginning at time 612, lasting for the duration T−t3 523, and then stopping receiving and playing back the missed voice stream portion via the voice call 602 beginning at time 624. At time 624, SD 52 may similarly transition to an idle state (on a conventional channel) or return to a control channel (in a trunked system), among other possibilities.

At optional step 414 of FIG. 4, the late entry SD re-plays back the voice stream portions of the previously transmitted voice call 502 it had received and optionally stored at step 404 (e.g., that is not made available in its entirety via the voice call 602). The late entry SD may be configured to automatically begin playing back stored voice stream portions of the previously transmitted voice call 502 at step 414, or may prompt a user and, only upon receipt of a manipulation of a user interface of the late entry SD by the user to indicate a desire to re-play back the stored voice stream portions of the previously transmitted voice call 502, does it actually begin re-playing back the stored voice stream portions of the previously transmitted voice call 502.

For example, and with reference to FIG. 6, SD 42 may have previously stored the voice stream portion of the voice call 502 received during time t2 of FIG. 5, and at time 614 of FIG. 6, may begin to re-play back the stored voice stream portions of the voice call 502 (automatically or upon user request). Similarly, SD 52 may have previously stored the voice stream portion of the voice call 502 received during time t3 of FIG. 5, and at time 624 of FIG. 6, may begin to re-play back the stored voice stream portion of the voice call 502 (automatically or upon user request).

One advantage of re-playing back the stored voice stream portion of the previously transmitted voice call is that the user will be able to re-interpret audio/voice communications of the previously transmitted voice call in the context of the (now played back) missed voice stream portion of the voice call, which may change the user's understanding of audio included and played back in the previously transmitted (and stored) voice call that the SD entered late.

FIG. 7 illustrates an example in accordance with an embodiment for enabling replaying of a missing voice stream portion from the perspective of an infrastructure controller device, such as controller device 26 of FIG. 1. In some embodiments, only certain types of calls, such as emergency calls (which are signaled as such in the call request and/or embedded within the call) may be provided the corresponding ability to replay missing voice stream data functionality, while non-emergency calls are not. Other possibilities exist as well.

Starting then at step 702 of FIG. 7, the controller device receives a voice call and causes the voice call to be transmitted to a plurality of SDs on a radio channel. For example, and with reference to FIG. 1, controller device 26 may receive a voice call addressed to a group G_A from dispatch console 38, another SD (not shown) being served by BS 20 or some other BS, or via external networks 34 and, and cause the voice call to be transmitted to group member SDs 12, 42, 52 subscribed to the group G_A via BS 20 (perhaps among other group member devices served by other BSs or other infrastructure devices in communication network 10 or other communication systems linked to communication network 10).

At step 704, the controller device stores the voice stream of the voice call locally (e.g., as decoded digitally encoded voice or as the formatted voice streams themselves) or at a remote storage area communicably coupled to the controller device, and monitors a duration of the voice call (e.g., via a call duration timer or call start and/or call end timestamps). For example, and with reference to FIG. 5, the controller device tracks the duration T 505 of the voice call 502 while causing the voice call to be provided on the radio channel from a start time 504 to an end time 506.

At step 706, the controller device detects an end of the voice call. For example, the SD may detect an end of the voice call by receiving a message from the device sourcing the voice call indicating a release of a PTT button or other input switch. In some embodiments, the SD may be configured to determine that the voice call has ended when a threshold period of time has passed without any new detectable audio being received from the source device.

In still other embodiments, the controller device may receive a message from the device sourcing the voice call indicating the release of a PTT button or other input switch, and in response, may cause an indication of a call hang time start to be transmitted to the plurality of SDs on the radio channel (perhaps among other group members as well). For example, and with reference to FIG. 5, the controller device transmits a message at a time indicated by reference numeral

506 indicating the start of a call hang time 507. In this example, the controller device may be configured to identify the end of the voice call as the time that the message indicating the release of the PTT button was received. In another example, the controller device may be configured to identify the end of the voice call as the time after expiration of a preconfigured system call hang time after the time that the message indicating the release of the PTT button was received. Other possibilities exist as well.

At step 708, the controller device receives one or more indications of received voice call durations from one or more late entry SDs out of the plurality of SDs that received the voice call at step 702. As set forth with respect to step 408 of FIG. 4, in some embodiments the controller device may receive voice call duration indications from each late entry SD, while in other embodiments, it may receive voice call duration indications from less than all late entry SDs or even just a single late entry SD providing a smallest voice call duration indication. For example, and with reference to FIG. 5, the controller device may receive a voice call duration value t2 515 from SD42 and a voice call duration value t3 525 from SD52. Furthermore, and as set forth earlier, the indications of call durations may be in the form of received call duration values or in the form of call start and/or call end timestamps (from which the controller device may calculate call durations), among other possibilities.

At step 710, the controller device identifies a minimum received voice call duration out of the one or more received voice call duration indications. In an embodiment, such as that set forth above, where only a single late entry voice call duration is received, identifying a minimum received voice call duration may include simply identifying the only received voice call duration. In embodiments where a plurality of voice call durations are received, a comparison of the values is used to identify the smallest received voice call duration. For example, and with reference to FIG. 5, the smallest received voice call duration would be t3 525 received from SD 52.

At step 712, the controller device calculates a third duration as a function of the total duration of the voice call (determined at step 704) and the minimum received duration (determined at step 710). For example, and with reference to FIG. 5, the third duration would be equal to T−t3, which identifies the maximum voice stream portion of the voice call 502 missed by all target SDs of the call, so that a single further re-transmission of the length T−t3 of the voice call 502 would satisfy any and all late entry SDs that joined the voice call 502 late, in this case including the duration T−t2 associated with the missed portion of the voice call 502 for SD 42 as well.

At step 714, the controller device retrieves the stored voice stream portion of the voice call (e.g., unformatted encoded digital audio or formatted bursts, packets, messages, frames, etc. containing digitized audio representing a portion of the entire voice call, among other possible signaling and/or other payload data) that make up the third duration of the voice call that was stored at step 704, re-formats the unformatted digitized audio into a new audio stream if necessary, and causes the retrieved voice stream portion of the stored voice call to be re-transmitted to the late entry SDs on the radio channel for the third duration. For example, and with reference to FIG. 6, the radio controller causes the missed voice stream portion to be re-transmitted as a late entry re-transmitted voice call 602 on the radio channel starting at time 612, allowing SD 42 to retrieve its missing voice stream portion of the original voice call 502 by retrieving, decoding, and playing back the portion of the re-transmitted voice call 602 from time 612 to time 614 (e.g., equal to time T−t2 513) and allowing SD 52 to retrieve its missing voice stream portion of the original voice call 502 by retrieving, decoding, and playing back the portion of the re-transmitted voice call 602 from time 612 to time 624 (e.g., equal to time T−t3 523).

3. CONCLUSION

In accordance with the foregoing, an improved method and apparatus for replaying a missing voice stream portion is disclosed. As a result, a more robust communications system can be provided, improving communication capabilities of response groups and improving the accuracy and clarity of group communications for late entry subscriber devices. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for replaying a missing voice stream portion at a late entry subscriber device in a wireless radio network, the method comprising:
   joining, by a subscriber device, a transmitted voice call on a radio channel via a base station of the wireless radio network and detecting, by the subscriber device, that it is late to the voice call and missed a portion of the voice call that was transmitted prior to the subscriber device joining the voice call;
   continuing, by the subscriber device, to receive a remaining portion of the voice call and playing back the remaining portion of the voice call;
   detecting an end of the voice call;
   calculating a first duration of the remaining portion of the voice call received at the subscriber device,
   detecting transmission of a second late entry request message from another subscriber device requesting re-transmission of a second missed portion of the voice call, the second late entry request message including an indication of a second duration of a remaining portion of the voice call received at the another subscriber device shorter than the first duration;
   determining not to transmit a first late entry request message to the base station requesting re-transmission of the missed portion of the voice call based on the fact that the second duration of the remaining portion of the voice call is shorter than the first duration of the remaining portion of the voice call;
   receiving, by the subscriber device from the base station on the radio channel, an indication of a total duration of the voice call;
   calculating, by the subscriber device, a third duration as a function of the total duration and the first duration; and
   receiving, by the subscriber device via the radio channel, the missed portion of the voice call and playing back the missed portion of the voice call for the third duration.

2. The method of claim 1, wherein the radio channel is one of a first time slot of a multi-slot time division multiple access (TDMA) radio channel, a frequency division multiple access (FDMA) radio channel, and an orthogonal frequency division multiplexing access (OFDMA) radio channel.

3. The method of claim 1, wherein the radio channel is one of a conventional land mobile radio (LMR) radio channel, a trunked LMR radio channel, and a multimedia broadcast multicast services (MBMS) long term evolution (LTE) channel.

4. The method of claim 1, further comprising, while continuing to receive the remaining portion of the voice call and playing back the remaining portion of the voice call, storing the remaining portion of the voice call, and after playing back the missed portion of the voice call for the third duration, re-playing back the remaining portion of the voice call.

5. The method of claim 1, further comprising transmitting the first late entry request message to the base station requesting re-transmission of the missed portion of the voice call.

6. The method of claim 5, further comprising transmitting the first late entry request message at a hold-off time period after detecting the end of the voice call, the hold-off time period determined as a function of the first duration of the remaining portion of the voice call.

7. The method of claim 5, wherein the indication of the first duration is a timed duration calculated while receiving the remaining portion of the voice call.

8. The method of claim 5, wherein the indication of the first duration is a time stamp indicating a time of receipt of a first portion of the remaining portion of the voice call.

9. The method of claim 1, further comprising detecting transmission of the second late entry request message from another subscriber device requesting re-transmission of the second missed portion of the voice call, the second missed portion including the missed portion of the voice call.

10. The method of claim 1, further comprising, after the third duration, switching from the radio channel to a control channel in the wireless radio network.

11. The method of claim 1, wherein detecting an end of the voice call comprises detecting the beginning of a call hang time.

12. The method of claim 1, wherein detecting an end of the voice call comprises detecting an expiration of a call hang time.

13. The method of claim 1, wherein the subscriber device detecting that it is late to the voice call comprises the subscriber device detecting a call update message on a control channel for the voice call instead of a call grant message.

14. The method of claim 1, wherein the subscriber device detecting that it is late to the voice call comprises detecting a link control message with call information embedded in the voice call instead of a call header with the call information preceding the voice call.

15. A method for enabling a replaying of a missing voice stream portion at a late entry subscriber device in a wireless radio network, the method comprising:
   causing to be transmitted, by an infrastructure controller, a voice call to a plurality of wireless subscriber devices in the wireless radio network on a radio channel;
   storing, by the infrastructure controller, the voice call and determining a total duration of the voice call;
   detecting an end of the voice call and transmitting, to the plurality of target wireless subscriber devices, an indication of the end of the voice call;
   receiving, from one or more late entry target wireless subscriber devices out of the plurality of target wireless subscriber devices, one or more indications of received durations of the voice call at respective ones of the late entry target wireless subscriber devices;
   identifying a minimum received duration out of the one or more indications of received durations of the voice call;
   calculating a third duration as a function of the total duration and the minimum received duration; and
   causing to be re-transmitted, by the infrastructure controller, a missed portion of the voice call to the one or more late entry wireless subscribers in the wireless radio network on the radio channel for the third duration.

* * * * *